United States Patent [19]
Shachar

[11] Patent Number: 6,012,102
[45] Date of Patent: *Jan. 4, 2000

[54] SYSTEM USING MACHINE-READABLE PRINTED SYMBOLS CREATED FROM ENCODED DATA RESOURCE SPECIFIERS TO ESTABLISH CONNECTION TO DATA RESOURCE ON DATA COMMUNICATIONS NETWORK

[75] Inventor: Yuval Shachar, Herzlia, Israel

[73] Assignee: InfoGear Technology Corporation, Redwood City, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/626,419

[22] Filed: Apr. 2, 1996

[51] Int. Cl.[7] .............................. G06F 15/16; G06F 13/14
[52] U.S. Cl. .............................. 710/5; 709/223; 709/247; 235/462; 235/385
[58] Field of Search .............................. 358/448; 235/385, 235/462; 395/312, 821; 710/5; 348/7; 709/223, 247

[56] References Cited

U.S. PATENT DOCUMENTS

| | | | |
|---|---|---|---|
| 4,654,482 | 3/1987 | DeAngelis | 379/95 |
| 5,288,976 | 2/1994 | Citron et al. | 235/375 |
| 5,292,004 | 3/1994 | Cesarini | 209/3.1 |
| 5,640,193 | 6/1997 | Wellner | 348/7 |

*Primary Examiner*—Thomas C. Lee
*Assistant Examiner*—Rehana Perveen
*Attorney, Agent, or Firm*—Michael A. Glenn

[57] ABSTRACT

Access to data resources on data communications networks is simplified by encoding data resource identifiers into a machine-readable printed symbol which can be scanned into a computer-based data communications terminal. The machine-readable printed symbol can be a bar code or in the form obtainable with any other printed encoding technology which encodes digital information in printed form so that it can be electronically read. Once the symbolic representation of the data resource specifier is read into the computer, software running on the computer can use a data resource identifier to access internet resources. Various features are directed to compressing the size of the data resource identifier to fit within a short symbol such as a bar code on a business card.

19 Claims, 3 Drawing Sheets

SYSTEM USING MACHINE-READABLE PRINTED SYMBOLS CREATED FROM ENCODED DATA RESOURCE SPECIFIERS TO ESTABLISH CONNECTION TO DATA RESOURCE ON DATA COMMUNICATIONS NETWORK

TECHNICAL FIELD OF THE INVENTION

The invention relates to computer networks and, more particularly, to techniques for locating data resources on computer networks.

BACKGROUND OF THE INVENTION

The use of computer networks has grown dramatically in recent years, far exceeding the expectations and predictions of most computer industry experts. One of the largest and fastest growing computer networks is commonly known as the "Internet", a world-wide "network of networks" made up of many thousands of interconnected computers and computer networks. (The name Internet derives from the shortening of "internetwork").

The term "internet" actually has two usages. Without capitalization, it generally refers to any interconnected set of networks (e.g., local area networks (LANs), wide area networks (WANs), etc.). When capitalized, however, (i.e., "Internet") it generally refers to "the" Internet described above.

Today's Internet is a global resource connecting millions of users that began as an experiment over 20 years ago by the U.S. Department of Defense. Although the networks that make up the Internet are based on a standard set of protocols (a mutually agreed upon method of communication between parties), the Internet also has gateways to networks and services that are based on other protocols.

One of the most common features of the Internet is the exchange of electronic mail (E-mail). Many Internet users print E-mail addresses on their business cards along with their telephone and fax numbers. Any Internet user or any subscriber to most major online services (e.g., Compuserve, America Online, etc.) can exchange E-mail with any other connected user as long as he knows the other user's Internet E-mail address. E-mail messages, however, are limited to textual data only, and may be subject to size restrictions.

Another major feature of the Internet involves a data exchange facility commonly referred to as "FTP" (for "File Transfer Protocol," the transfer protocol which governs data exchange) by which users can exchange binary data with any Internet site which supports FTP (FTP site). FTP users can download or upload binary files of any size over the Internet, and can browse through file directories on remote FTP sites. Other Internet FTP-related facilities provide the ability to search for information by content, title, topic, etc. FTP sites and files are identifiable by a special Internet address specifier which identifies the FTP protocol, Internet site and/or file name and location.

In the last few years, an Internet hypertext facility commonly known as the "World Wide Web", or "WWW", has become increasingly popular. The WWW facility includes inter-linked hypertext documents, known as "web pages". These documents utilize a hypertext language called "HTML" (Hyper Text Meta (or Markup) Language) and are processed on the Internet according to a Hypertext Transfer Protocol ("HTTP"). Any web page can link (i.e, reference or "point to") any other web page anywhere on the Internet. As a result, web pages are spread out all over the Internet. Web pages generally provide a "point and click" style of user interface which requires very little user training. As with FTP data resources (files), web pages are identifiable by a special Internet address (known as a Universal Resource Locator, or URL) which identifies the hypertext protocol (e.g., HTTP) for web pages and the Internet site on which the web page is located. Many WWW sites have a default "home page" or web page which is automatically accessed whenever the site is referenced.

Addresses of resources on the Internet are specified by the URLs which are long character strings composed of a protocol name and an address (or URN—Universal Resource Name), which includes the path to the requested resource. The accepted format is a string of the form "protocol-name://hostname/path". Occasionally, the protocol may be inferred from operations already being performed. For example, if one is browsing directories on an Internet site for the purpose of downloading, the "ftp://" file transfer protocol is generally assumed. In such cases, many browser programs permit the specification of a resource (e.g., file) by the URN only. Similarly, if one is browsing WWW pages, it may reasonably be assumed that the "http://" hypertext transfer protocol is in use and should be the default protocol unless otherwise specified. Internet E-mail addresses are "strings" having the general format: "user-name@hostname".

Given the electronic nature of the Internet, these URL character strings are usually referenced in electronic documents or in printed matter by reproducing the entire string. To access a resource, a user will either electronically copy its associated string (if the URL string is available electronically) to an application (e.g., software program) capable of accessing it, or will manually type it into such an application (if the URL string is printed in a hard copy document).

Evidently, the minimum knowledge necessary to contact another party via E-mail or to send or receive information via the Internet is an Internet address; either an E-mail address or a URL/URN specifying an FTP or WWW resource. Unfortunately, these addresses can be very long and difficult to remember.

By way of example, a particular web page might be identified by the Internet URL:

"http://www.hostcomp.com/pub/indexes/userinfo/homepage.html".

In this example, "http://" identifies the hypertext protocol (the two forward slashes '//' are a special delimiter used to separate the protocol name from the rest of the URL), "www" refers to the "world wide web", "hostcomp.com" refers to a host computer at a commercial site, "/pub/indexes/userinfo/" identifies a specific directory on the host computer's storage database, and "homepage.html" is a file specifier for a hypertext web page written in HTML. When this URL is given to WWW processing software (i.e., a "Web Browser"), the hypertext web page is retrieved over the internet and executed for display to the user. It is beyond the scope of this specification to go into the details of Internet, WWW and FTP protocols and information transfer mechanisms. However, those of ordinary skill in the art already understand and appreciate the underlying principles and mechanisms.

Many Internet sites provide services and information to Internet users via WWW, FTP, E-mail, and other mechanisms. Many television and radio news departments, movie studios, research laboratories, universities, manufacturers, vendors and a variety of others have publicly-accessible WWW or FTP sites. It is not uncommon to see or hear a news broadcast refer to an Internet URL by which more information on a story can be obtained. Numerous manufacturers provide technical support and documentation via the Internet, and print their WWW or FTP addresses in their advertisements and literature.

For the end user, however, the explosion of Internet URLs and E-mail addresses can be somewhat overwhelming. These addresses must be remembered or carried around on a piece of paper, then manually typed into a computer (or other Internet access terminal). This process is cumbersome, error-prone, and can be frustrating for the user.

SUMMARY OF THE INVENTION

Although the foregoing discussion has been directed almost exclusively to accessing and exchanging information via "the" Internet, those of ordinary skill in the art will immediately understand that it applies equally well to other internets (non-capitalized), and that the ensuing description of the invention should be considered as being applicable to the most general set of applications.

It is, therefore, an object of the present invention to provide a technique for accessing inter-network (internet) resources which does not require memorization of long Internet resource specifiers (URLs).

It is a further object of the present invention to provide a technique for accessing inter-network resources without manual entry of a long resource specifier.

It is a further object of the present invention to provide a technique for encoding inter-network resource specifiers into an electronically readable symbol.

It is a further object of the present invention to provide a technique for electronically scanning an electronically readable symbol and automatically accessing an inter-network resource specified by the symbol.

According to the invention, a machine-readable printed symbol is encoded with a data resource identifier for identifying a data resource on a data communications network. An electronic scanning mechanism such as a bar code wand or scanner is used to read and decode the machine-readable printed symbol to retrieve the data resource identifier. A computer to which the bar code wand or scanner is connected receives the data resource identifier and, under the control of application software resident on the computer, operates on said data resource identifier to store the data resource identifier and/or to establish a data communications session and access the data resource specified by the data resource identifier via a network interface (e.g., modem or LAN card).

According to an aspect of the invention, the machine readable printed symbol can be a bar code.

According to another aspect of the invention, the data resource identifier encoded into the machine readable printed symbol can be an Internet Universal Resource Locator.

According to another aspect of the invention, the data resource identifier encoded into the machine readable printed symbol can be an Internet E-mail address.

According to another aspect of the invention, the data resource identifier can be encoded into the printed symbol in a plain-text format.

Other aspects of the invention provide for reducing the size of the data resource identifier prior to encoding by partial or full tokenization, or by replacing portions of the resource specifier with numerical ID's. For example, an Internet site computer can be represented by a 32-bit numerical host ID.

Another aspect of the invention provides for encoding a resource identifier (ordinarily a file name would be used) as a numerical Resource ID which can be interpreted by the site computer on which the data resource represented by the resource identifier resides.

The inventive techniques provide for several tokenization methods of reducing the size of a data resource identifier, including, but not limited to: replacing common character sequences with corresponding tokens, encoding protocol names (e.g., http, ftp, etc.) as tokens, etc.

By providing a user with a technique for accessing data resources on communications networks by scanning a printed symbol, the user is no longer required to memorize lengthy and cryptic strings of characters. Access to data is dramatically simplified, and the tedium of manual entry of resource identifiers is eliminated.

Other objects, features and advantages of the invention will become apparent in light of the following description thereof.

DETAILED DESCRIPTION OF THE INVENTION

The present invention provides a technique for encoded printed presentation and manipulation of addresses of data and/or information resources located on an internet, e.g., the Internet. The printed form of the addresses can be, for example, a bar-code, or other digitally encoded representation which can be scanned electronically. A terminal device for Internet access (e.g., a personal computer or smartphone adapted to data services) is provided with a scanner for reading the encoded address. Application software running on the terminal device would then use the scanned address to establish a network connection, or simply to store the scanned address for later access. Using this technique, it is possible to scan a bar coded representation of a WWW site address (printed, for example, on a business card, in a newspaper ad, or the like) and to automatically and immediately generate an Internet connection to the WWW site and to display/activate a web page. In its simplest form, the inventive technique can be implemented as a bar-code scanner and decoder connected as a keyboard "wedge" which enters characters into a computer by emulating user keystrokes. (A "wedge" is simply a piece of hardware (not shown) connected between a computer keyboard and processor the function of which is, as mentioned, to emulate a typically long series of keystrokes.)

Figure 1:
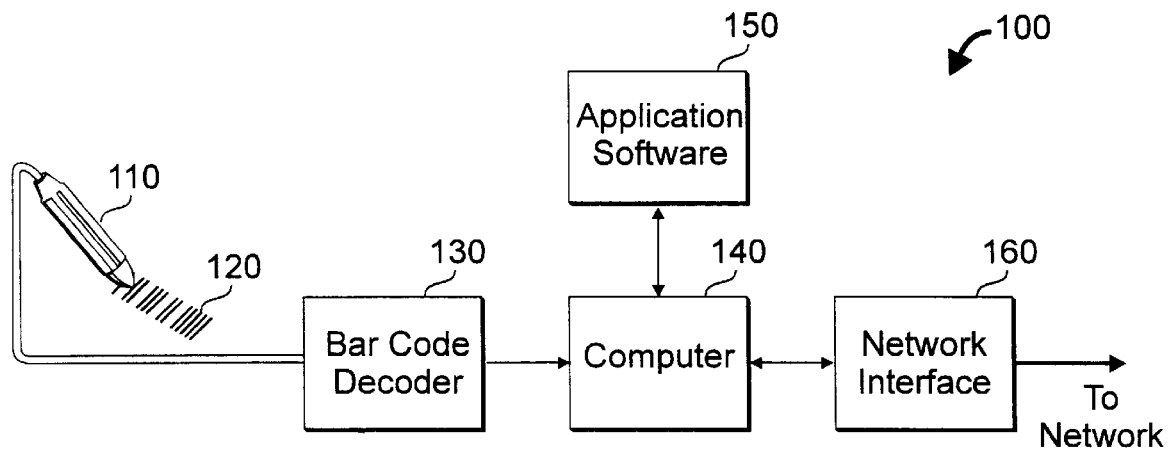
FIG. 1 is a block diagram of apparatus for accessing Internet resources using a bar-code scanner, according to the invention.

FIG. 1 is a block diagram of apparatus 100 for accessing Internet resources using an electronic scanner 110, e.g., a bar code wand or scanner. The electronic scanner 110 scans an encoded symbol 120, into which an inter-network resource or E-mail address has been encoded and provides an output which is an electronic signal (in digital, computer-readable format) representative of the scanned symbol 120. A decoder 130 (e.g., a bar-code decoder, if bar codes are used) converts the electronic signal representative of the scanned symbol 120 into a computer readable form (e.g., binary or textual information). A computer 140 (or processor in a smartphone or other intelligent terminal device), under the control of application software 150, receives the computer-readable form of the encoded inter-network resource or E-mail address and uses it to establish an inter-network connection to the specified address via a network interface 160. (As mentioned hereinabove and hereinbelow, such resource specifiers can simply be stored, for subsequent use in accessing sites on the internet.) The network interface 160 can be a LAN connection to an inter-networked LAN, a dial-up network connection via the public switched telephone network (PSTN), or any other suitable network connection technique (e.g., ATM, ISDN, etc.).

The encoded symbol 120 can be an ordinary bar code (one dimensional pattern of bars and spaces between bars, the bars and spaces having varying width), or any suitable type of symbol, such as Postnet code (used by the US Post Office to specify mail routing information), or a more elaborate two-dimensional code, such as PDF-417 or other stacked bar code technology.

The present invention provides for several different methods of encoding a resource address (e.g., Internet URL, E-mail address, or other similar network specifier) into a symbol. One such technique involves selecting an encoding scheme (such as is available with many bar code standards) which permits direct encoding of textual information. Using this technique, the resource address is encoded directly into the symbol in its "plain text" form. For resource addresses which are short enough to fit within a bar code, or for denser encoding techniques (such as PDF-417), this direct encoding technique is the simplest approach.

Figure 2A:
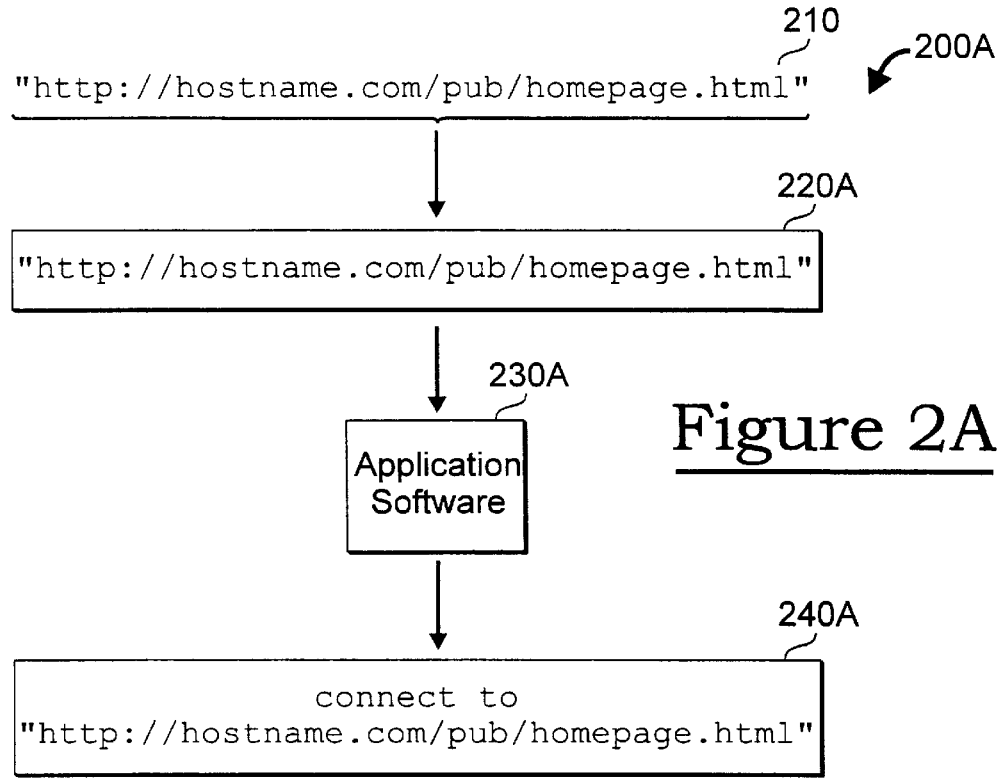
FIG. 2A is a block diagram illustrating a technique for directly storing an Internet URL or E-mail address in a bar-code and accessing an Internet resource using the bar code, according to the invention.

FIG. 2A is a block diagram illustrating such a direct encoding technique 200A. A network resource address 210 (an Internet URL for a web page is shown) is encoded directly into a symbol 220A (e.g., a bar code symbol 120). The symbol 220A is represented in FIG. 2A as a box with the encoded information in it. This symbol 220A can be produced by any suitable printed symbol technology which is capable of encoding textual information. Those of ordinary skill in the art are acquainted with a wide variety of suitable symbol encoding technologies and will immediately appreciate the suitability of those technologies for use according to the present invention. For example, barcode-printers made by Zebra Technologies of Everett, Washington incorporate a symbol encoding technology.

Application software 230A, corresponding to application software 150, running on a network terminal device (e.g., a personal computer or other intelligent terminal device such as 140) accepts the data (URL) encoded in the symbol 220A (retrieved by scanning as shown and described hereinabove with respect to FIG. 1) and interprets the data as a network resource address. After decoding the symbol, the application software 230A can generate a request 240A to connect to the specified resource or E-mail address 210. The application software 230A then automatically establishes a network session to connect to the specified network resource address, behaving exactly as if the resource address were entered manually by a user. Application software for performing such network access (i.e., assuming that an address has previously been stored, or has previously been loaded via an active internet connection) is well known to those of ordinary skill in the art. Two notable examples of such application software ("browsers") are Netscape (TM) and Mosaic (TM).

Most network browser programs such as these also have "address book" and "favorite places" (or "bookmark") capability for storing frequently used E-mail addresses and resource identifiers. As an alternative to manual entry of these data items, the present inventive techniques can be employed to "scan" in E-mail addresses or resource specifiers from business cards, advertisements, product literature, etc., for storage in these "address book" and/or "favorite places" databases. As before, the application software 230A can treat the scanned, encoded address in much the same manner as it would treat a manually entered network address.

Another technique for encoding an E-mail address or other resource locator (e.g., URL) into a symbol is to "tokenize" frequently-used character sequences, such as "http://", "ftp://", ".edu", ".com", etc., into a compact form ("token") and to replace the plain text character sequence in the E-mail address or resource locator with the token. This technique is described below with respect to FIG. 2B. Additionally, the network host for the site specified in the network resource locator can also be referred to by a numerical address. For example, on the Internet, any site computer has a 32-bit IP address. This IP address can be specified as decimal text, hexadecimal text, or as a 32-bit binary number, and encoded into the resource locator instead of a textual form of the IP address which usually occurs in URL's. It is within the capabilities of Internet's access protocols to address and connect to sites in this manner. Those of ordinary skill in the art will immediately appreciate that this technique has applicability to a more general set of inter-networks, beyond Internet. It is within the spirit and scope of the present invention to apply the inventive techniques to any suitable network and addressing scheme.

Figure 2B:
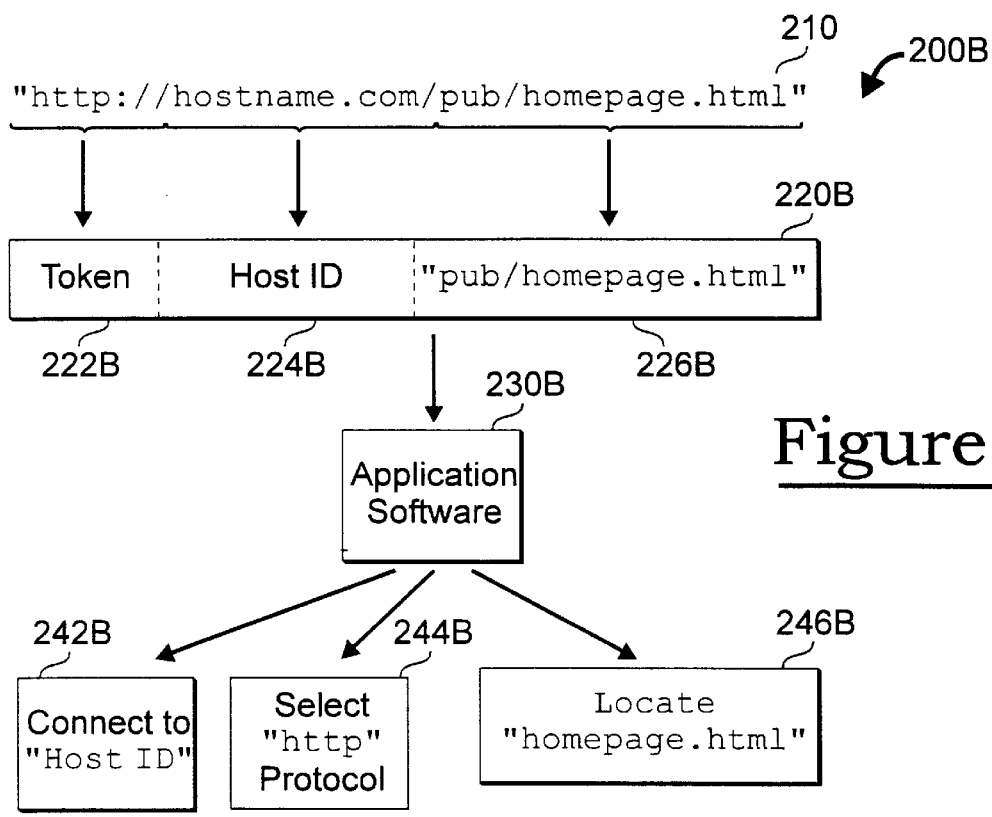
FIG. 2B is a block diagram illustrating a technique for partially-encoding an Internet URL or E-mail address in a bar-code and accessing an Internet resource using the bar code, according to the invention.

FIG. 2B is a block diagram illustrating a technique 200B for partial encoding (tokenizing/compaction) of a network resource address 210 (such as an Internet URL or E-mail address) into a printed symbol 220B, and accessing an Internet resource using the symbol 220B. In much the same manner as shown and described with respect to FIG. 2A, a network resource address 210 (an Internet URL for a web page is shown) is encoded into a symbol 220B (e.g., a bar code symbol). Unlike the direct encoding technique of FIG. 2A, however, the symbol 220B is encoded with a partially-tokenized form of the network resource address 210, with tokens 222B (short unique symbols or character sequences) replacing frequently occurring character sequences (e.g., protocol specifiers such as "ftp://" and "http://", or common delimiter characters "/", ".", "_", or common character sequences such as ".edu", ". com", "net", etc.). Thus, a token can be used for compaction and/or to replace a delimiter, for which a direct bar code translation may not be available, with a series of symbols that can be directly translated. Additionally, the site specifier (e.g., "hostname.com") is replaced with a numerical ID 224B (e.g., internet 32-bit IP address) in the symbol 220B. In binary form, an Internet IP can be completely specified in four bytes. The resource specifier (filename) portion of the resource address 210 (i.e., "homepage.html") is encoded as plain text 226B.

As described above with respect to FIG. 2A, application software 230B running on a network terminal device (e.g., a personal computer or other intelligent terminal device such as 140) accepts the data (URL) encoded in the symbol 220B (retrieved by scanning as shown and described hereinabove with respect to FIG. 1) and interprets the data as a network resource address. The application software 230B uses request 242B for requesting a connection to the network site specified by the numeric identifier 224B, request 244B for selecting the protocol specified by the token(s) 222B and request 246B for requesting the resource specified by the resource specifier 226B.

Figure 2C:
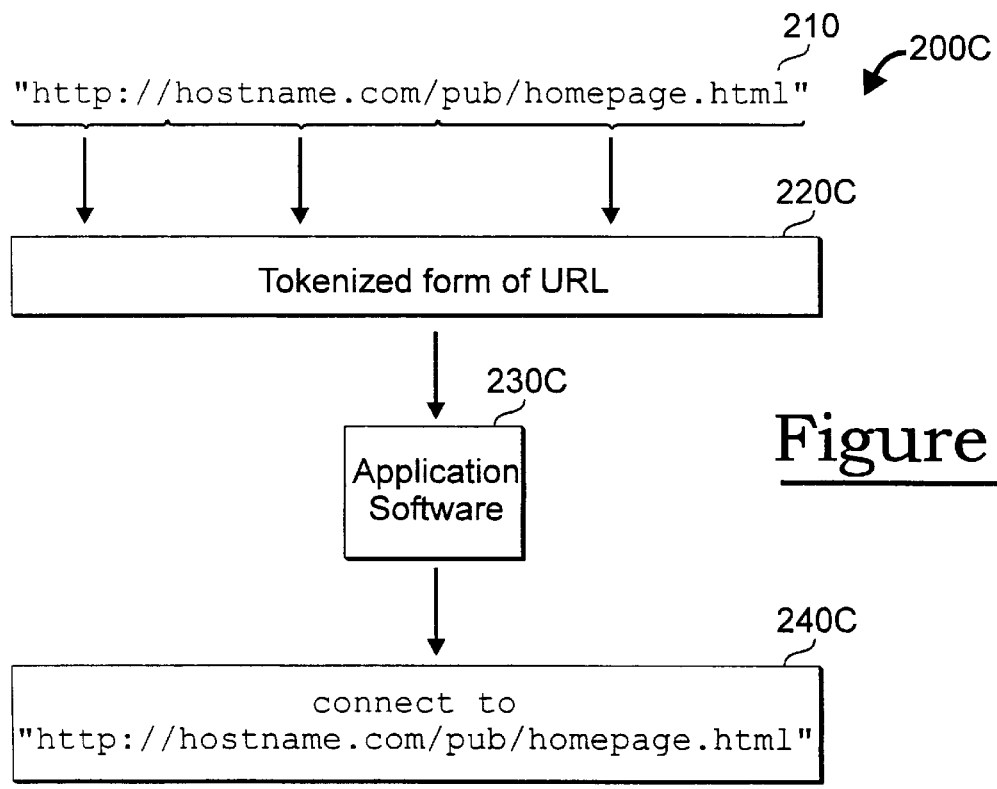
FIG. 2C is a block diagram illustrating another technique for encoding an Internet URL or E-mail address in a bar-code and accessing an Internet resource using the bar code, according to the invention.

FIG. 2C is a block diagram illustrating another technique 200C for encoding an Internet URL or E-mail address 210 into a printed symbol 220C and accessing an Internet resource using data retrieved by scanning the symbol 220C. In this case, the plain text resource locator 210 is fully-tokenized (digitally compressed) by any suitable technique (e.g., Huffman coding, tokenization of frequently used character sequences, etc.). The application software 230C must re-expand the fully-tokenized symbol into a full resource locator or E-mail address, which is used in a network connection request 240C to access the specified network resource.

Figure 2D:
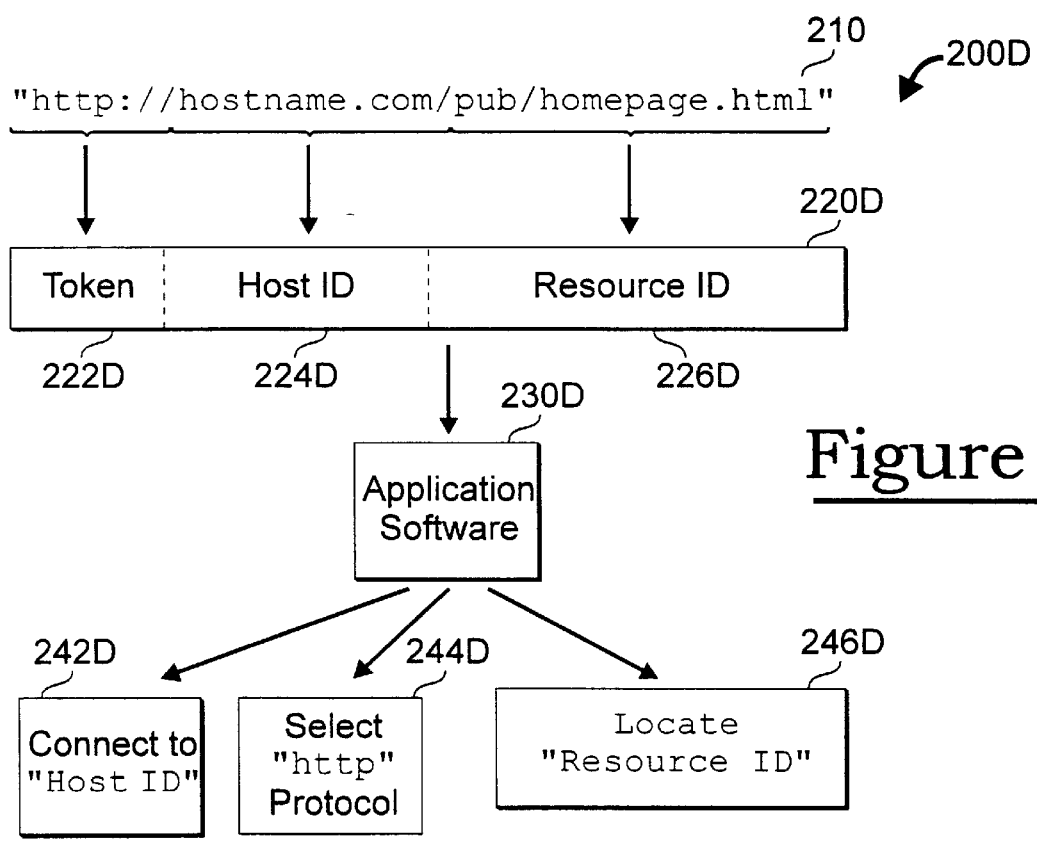
FIG. 2D is a block diagram illustrating still another technique for encoding an Internet URL or E-mail address in a bar-code and accessing an Internet resource using the bar code, according to the invention.

FIG. 2D is a block diagram illustrating yet another technique 200D for encoding a resource locator or E-mail address 210 into a printed symbol 220D, and accessing a network resource using data retrieved by scanning the printed symbol 220D. In this case, the printed symbol is encoded by substituting a token 222D for the protocol specifier portion of the resource locator, a numeric host identifier 224D (Host ID) is used to reference a network site, and a numeric resource identifier (Resource ID) 226D is used to reference a resource at the network site. In this case, a computer at the network site is readily programmed, such as with use of an index table, to translate the numeric Resource ID 226D into a specific resource reference. By using this form of symbol, the size of the printed symbol is kept as small as possible.

As described above with respect to FIG. 2D, application software 230D running on a network terminal device (e.g., a personal computer or other intelligent terminal device) accepts the data (URL) encoded in the symbol 220D (retrieved by scanning as shown and described hereinabove with respect to FIG. 1) and interprets the data as a network resource address. The application software 230D uses request 242D for requesting a connection to the network site specified by the numeric identifier 224D, request 244D for selecting the protocol specified by the token(s) 222D and request 246D for requesting the resource specified by the numeric Resource ID 226D.

When attempting to encode a long Internet URL into a low-density bar code, there may be insufficient physical space for a symbol which encodes the entire URL. This is especially true when there is limited printing space available, such as on a business card. In such a case, the techniques described hereinabove with respect to FIGS. 2B, 2C, or 2D are generally preferred.

In general, a method of using the present inventive techniques consists of performing the following steps:

1. Encoding and printing a symbol representing an inter-network resource address or E-mail address using one of the techniques described hereinabove.

2. Providing the printed symbol, such as a bar code, to one or more users on a printed medium, such as a business card, plastic card, newspaper or magazine advertisement, product brochure, etc.

3. Scanning and decoding the symbol with an electronic scanning device/decoder to produce data representing the inter-network resource address or E-mail address encoded into the symbol.

4. Using the data retrieved from the symbol in (3) above to reference a resource or E-mail address on an internetwork, such as the Internet.

As an alternative to step (4) above, the decoded data from the symbol retrieved in step (3) above can simply be stored in, for example, an electronic "address book" or list of "favorite places" for later use in accessing an Internet resource, for example.

Bar codes have been used in the past in the context of TV programming guides (e.g., VCR+Plus (TM)). The bar codes are printed in printed TV guides, include data about programs and viewing times, and are used for automatically programming a VCR (Video Cassette Recorder). VCR+Plus (TM) bar codes, and similar techniques for representing TV programming information are used locally between the scanning apparatus and a TV. Unlike the present inventive technique, however, they do not encode unique resources addresses but, rather, time and channel data which is location dependent (i.e., different geographical locations have different programming based upon the local stations which carry the programming). Further, there is no interaction involved in bar-code television programming; the commands are strictly "one-way"—namely, to turn on the TV or VCR and select a channel at a particular time.

The following patents, incorporated by reference herein, are cited as representative of related prior art:

U.S. Pat. No. 4,654,482 describes a system which uses bar codes for identification purposes and for function command purposes for a home ordering system. In this system, orders can be placed from a user's home using the direct dial telephone network. The orders are placed from printed materials such as catalogues, newspaper inserts or other advertising material which carry an item identification bar code adjacent to a description of an item. This bar code is scanned into a processing device at the user's location. The bar code encodes identification data (an item ID number, similar to UPC—Universal Product Code) and transactional information related to the vendor of the item. The processing device is operated by the user depressing switches to invoke desired actions (e.g., send, select) or to provide desired responses (e.g., yes, no, etc.) in response to prompts on a display. These prompts are generated either locally within the processing device or remotely by a vendor's host computer. The vendor's host computer communicates with the processing device over the direct dial telephone network via a modem. In order to make purchases from different merchants, cartridges containing transactional information for various merchants are provided. Alternatively, a fixed memory containing transactional information relating to a number of different merchants can be used. In this case, one or more bar codes can serve to identify the different merchants and, if desired, to provide data associated with the merchants.

By way of contrast, the present inventive techniques permit data resources to be accessed over the Internet. No vendor-specific information is required to be stored. The present inventive techniques require only that a resource locator be encoded into a printed symbol such as a bar-code. If transactional processing is required, this can be accomplished via WWW or similar facilities once the resource connection is established. For example, if a vendor wishes to employ the present inventive techniques to sell a product over the Internet, he simply encodes the URL of a web page into a symbol in an advertisement. The web page, under control of HTML, can guide the transaction process. The vendor identification is implicit in the web page specification, and all of the transaction process is controlled by the remotely stored web page.

U.S. Pat. No. 5,292,004 describes a technique by which bar codes may be used to assist in sending messages, documents, parcels, etc. In this system, the bar-code contains two distinct data items: an identifier and a locator. The identifier is formed from the recipient's geographical area code and phone number. The locator is formed from the recipient's geographical coordinates.

By way of contrast, the present inventive techniques encode a "virtual" address, unlike a geographical address (e.g., street address or map coordinates). A printed symbol representation of an Internet address does not identify a recipient but, rather, a virtual location that can be publicly accessed. It cannot be uniquely identified by a telephone number and geographical coordinates.

U.S. Pat. No. 5,288,976 describes the use of bar codes in information, transactional and other system and service applications, and specifies encoding of an instruction field and a reference field into a bar code. The instruction field defines the action (or actions) to be performed on data in the reference field. The action performed on the data may be, for example, to interpret the data as a telephone number and to dial it.

The present inventive techniques do not require an "instruction field" since the present invention encodes only resource locator or E-mail addresses into a printed symbol. Further, U.S. Pat. No. 5,288,976 does not teach any method for encoding of strings as long as an Internet URL into a short bar code, such as those described hereinabove with respect to the present inventive techniques.

Although specific embodiments of the invention have been described in detail above, various other objects, features, advantages and embodiments of the invention would be readily apparent to one having ordinary skill in the art to which this invention most nearly pertains, all of which are deemed to fall within the spirit and scope of the present invention, as defined by the following claims.

What is claimed is:

1. A system for accessing a network data resource without manual entry of a resource specifier, for use with a machine-readable printed symbol encoded with a data resource specifier identifying a virtual location of a data resource on a data communications network where there is insufficient physical space for encoding the entire data resource specifier on said printed symbol, comprising:

means for creating a reduced data resource specifier by replacing character sequences in said resource specifier string with corresponding tokens representing at least one of said character sequences, wherein said data resource specifier is encoded into the printed symbol in a compressed format;

an electronic scanning mechanism for reading and decoding said machine-readable printed symbol to retrieve said reduced data resource specifier encoded therein, and for providing an electronic signal representative of said reduced data resource specifier;

a computer connected to said electronic scanning mechanism for receiving said electronic signal, said computer being responsive to application software residing thereupon to operate on said electronic signal under control of said application software; and a network interface connected to said computer for establishing communication with said data communications network for the purpose of accessing said data resource whose virtual location is identified by said reduced data resource specifier.

2. A system according to claim 1, wherein:
said machine-readable printed symbol is a bar code.

3. A system according to claim 1, wherein:
said printed symbol is an encoded Internet Universal Resource Locator.

4. A system according to claim 1, wherein:
said printed symbol is an encoded E-mail address.

5. A system according to claim 1, wherein:
said data resource specifier is encoded into the printed symbol in a partially takenized format.

6. A system according to claim 1, wherein:
said data resource specifier is encoded into the printed symbol in a format which includes a numerical network site identifier.

7. A system according to claim 1, wherein:
said data resource specifier is encoded into the printed symbol in a format which includes a numerical resource identifier.

8. A method of encoding a data resource specifier without manual entry of said resource specifier into a machine-readable printed symbol where there is insufficient physical space for encoding the entire data resource specifier on said printed symbol, comprising:

providing a resource specifier string that identifies a virtual location of a data resource on a data communications network;

providing a set of uniquely identifiable tokens for representing specific character sequences, each of said tokens representing a specific character sequence;

creating a reduced resource specifier by replacing character sequences in said resource specifier string with corresponding tokens representing those character sequences; and encoding said reduced resource specifier into a machine-readable printed symbol said data resource specifier is encoded into the printed symbol in a compressed format.

9. A method according to claim 8, wherein:
one or more of said tokens are provided for representing a protocol-name portion of said resource specifier string.

10. A method according to claim 8, wherein:
one or more of said tokens are provided for representing commonly-occurring sequences of characters.

11. A method according to claim 8, further comprising:
encoding a network site identification into said reduced resource specifier as a numerical host ID.

12. A method according to claim 8, further comprising:
encoding a resource identifier into said reduced resource specifier as a numerical resource ID.

13. A method according to claim 8, wherein:
said machine-readable printed symbol is a bar code.

14. A method of encoding a data resource specifier into a machine-readable printed symbol without manual entry of said resource specifier, where there is insufficient physical space for encoding the entire data resource specifier on said printed symbol and using the symbol to access a resource on a data communications network, comprising:

providing a resource specifier string that identifies a virtual location of said data resource on the data communications network;

providing a set of uniquely identifiable tokens for representing specific character sequences, each of said tokens representing a specific character sequence;

creating a reduced resource specifier by replacing character sequences in said resource specifier string with corresponding tokens representing those character sequences;

encoding said reduced resource specifier into a machine-readable printed symbol said data resource specifier is encoded into the printed symbol in a compressed format;

scanning said machine-readable printed symbol and decoding said symbol to retrieve said reduced resource specifier encoded therein;

establishing a data communications session with said data communications network; and using said reduced resource specifier to access said data resource identified by said reduced resource specifier.

15. A method according to claim 14, wherein:

one or more of said tokens are provided for representing a protocol-name portion of said resource specifier string.

16. A method according to claim 14, wherein:

one or more of said tokens are provided for representing commonly-occurring sequences of characters.

17. A method according to claim 14, further comprising:

encoding a network site identification into said reduced resource specifier as a numerical host ID.

18. A method according to claim 14, further comprising:

encoding a resource identifier into said reduced resource specifier as a numerical resource ID.

19. A method according to claim 14, wherein:

said machine-readable printed symbol is a bar code.

* * * * *